United States Patent [19]

Baranyai et al.

[11] Patent Number: 5,459,606
[45] Date of Patent: Oct. 17, 1995

[54] IN-SERVICE UPGRADE FOR A TELECOMMUNICATION SYSTEM

[75] Inventors: Lawrence Baranyai; Francis H. Butler, both of Howell; John C. Cox, Oakhurst; Chi H. Lin, Holmdel; Nattu V. Srinivasan, Eatontown, all of N.J.

[73] Assignee: AT&T IPM Corp., Coral Gables, Fla.

[21] Appl. No.: 58,185

[22] Filed: May 10, 1993

[51] Int. Cl.$^6$ ............................................. H04J 14/00
[52] U.S. Cl. ........................ 359/117; 359/128; 359/109
[58] Field of Search .................... 359/117–118, 110, 359/128, 139, 173; 370/16, 54, 60, 60.1; 379/202

[56] References Cited

U.S. PATENT DOCUMENTS

| | | | |
|---|---|---|---|
| 4,962,497 | 10/1990 | Ferenc et al. | 370/60.1 |
| 5,086,348 | 2/1992 | Le Roy | 359/117 |
| 5,153,757 | 10/1992 | Cloonan et al. | 359/117 |
| 5,229,990 | 7/1993 | Teraslinna | 370/16 |

*Primary Examiner*—David K. Moore
*Assistant Examiner*—Kinfe-Michael Negash
*Attorney, Agent, or Firm*—Robert P. Marley

[57] ABSTRACT

An upgrade arrangement wherein the switching functions of an in-service switch or cross-connect system are transferred or "re-homed" onto a new, larger capacity switch via the existing input and output ports of the original system. The re-homing can be performed without loss of service, even if the original system is operating at full-capacity. By exploiting the protection redundancy engineered into existing telecommunication switching systems, all of the signals being routed through the original switch are temporarily consolidated onto only one-half of the switching fabric normally required to accommodate such connectivity. This signal consolidation allows half of the original switch ports to be brought off-line (without a service disruption), and linked to the new, higher capacity switching fabric. The signals that had been consolidated within the original switching fabric are then re-routed onto the new switching fabric (via the linked ports), and the other half of the original switch ports are brought off-line and linked to the new switching fabric. The re-routed signals (still being switched in a consolidated format within the new switching fabric) are then redistributed (unconsolidated) among the linked ports and the new switching fabric so that a normal switching pattern is reestablished. Re-homing the signals onto a single new switching fabric allows all connections to be managed from a single control point. In addition, the re-homing to the new switching fabric is operationally transparent (timing and protocols within the switching system are unaffected, and full non-blocking access is maintained), and all existing cabling to and from the original input and output ports remains intact and functioning. In a preferred embodiment of the invention, the input and output ports of the original switching fabric are linked to the new switching fabric via electro/optic interfaces, which replace the standard input and output circuits of the original system.

8 Claims, 6 Drawing Sheets

5,459,606

IN-SERVICE UPGRADE FOR A TELECOMMUNICATION SYSTEM

TECHNICAL FIELD

The invention relates to telecommunication switching and transmission systems and, more particularly, to in-service upgrading of the capacity of such systems.

BACKGROUND OF THE INVENTION

Telecommunication switching and transmission systems sold today have a fixed-capacity, and, to minimize initial costs, service providers normally purchase systems having a capacity commensurate with, or marginally in excess of, immediate service demands. Typically, service demands grow to exceed the capacity of the purchased system, and telecommunication service providers find it necessary to migrate to larger capacity systems. To minimize additional expense and avoid service disruptions, service providers naturally want to preserve as much of the existing switching and transmission system as possible when expanding to accommodate increased traffic. As a result it is desirable to upgrade current systems, without noticeably impacting existing service. Presently, upgrading a system is a cumbersome, time consuming, labor intensive, and overall expensive undertaking.

A typical upgrade is performed on a telecommunication system by linking an additional telecommunication system to the existing system via a fixed number of hard wired connections called interframe ties. This type of linking does not result in an architecture that guarantees full non-blocking access. That is to say, not all traffic entering one system will be able to gain access to a free output pen on the other system. The degree to which such inter-system access can be obtained is a function of the number of interframe ties between the systems; increasing the ties increases the degree of access. Unfortunately, since each tie monopolizes a port on each system, increasing the number of interframe ties also reduces the overall traffic handling capacity of each system. Therefore, if two systems, each capable of accommodating N lines, are combined using this upgrading technique the resultant system will not support 2N lines. Before performing such an upgrade, the traffic flowing through the system must be carefully analyzed, and the trade-off between non-blocking access and overall traffic handling capacity considered so that the appropriate number of interframe ties may be calculated. As reconfiguring the upgraded system to alter the number of interframe ties is not easily accomplished, the upgraded system cannot be dynamically adapted to respond to subsequent changes in traffic patterns.

Furthermore, prescribed telecommunication standards and/or electrical transmission delay constraints require the additional system introduced in an interframe tie upgrade to be located within a relatively short distance of the existing switching system. As telecommunication equipment requires a substantial amount of floor space, and a fairly large supply of power, such collocation often proves very difficult, if not impossible, at the site of the existing telecommunication system. Another drawback of interframe tie upgrading is the introduction of multiple network operation control points. Both the original and additional systems are basically stand-alone units, each answering to its own controller. In order to harmonize and coordinate the operation of the systems after interframe ties are established, each controller must be linked to an operation support system or supervisory controller (e.g.; a network controller). This multiple controller hierarchy complicates network administration, restoration, provisioning, and monitoring.

As an alternative to upgrading via interframe ties, an existing system may be entirely replaced with a new, larger capacity system. This involves employing additional telecommunication equipment (such as patch panels and/or cross-connects) to temporarily link existing lines to both the new and the old systems, installing a great deal of new cabling to accommodate the new system, and effecting a smooth cut-over of service from the old to the new system (a primarily manual, technically difficult, and error prone process). Naturally, this alternative does not allow for much of the previous telecommunication system be to preserved, since the original switch, the input and output ports, and the cabling leading to and from the switch and ports are rendered useless within the upgraded system.

SUMMARY OF THE INVENTION

The aforementioned problems are solved, in accordance with the principles of the invention, by providing an upgrade arrangement in which the switching functions of an in-service switch or cross-connect system are transferred or "re-homed" onto a new, larger capacity switch via the existing input and output ports of the original system. The re-homing can be performed without loss of service, even if the original system is operating at full-capacity. By exploiting the protection redundancy engineered into existing telecommunication switching systems, all of the signals being routed through the original switch are temporarily consolidated onto only one-half of the switching fabric normally required to accommodate such connectivity. This signal consolidation allows half of the original switch ports to be brought off-line (without a service disruption), and linked to the new, higher capacity switching fabric. The signals that had been consolidated within the original switching fabric are then re-routed onto the new switching fabric (via the linked ports), and the other half of the original switch ports are brought off-line and linked to the new switching fabric. The re-routed signals (still being switched in a consolidated format within the new switching fabric) are then redistributed (un-consolidated) among the linked ports and the new switching fabric so that a normal switching pattern is reestablished. Re-homing the signals onto a single new switching fabric allows all connections to be managed from a single control point. In addition, the re-homing to the new switching fabric is operationally transparent (timing and protocols within the switching system are unaffected, and full non-blocking access is maintained), and all existing cabling to and from the original input and output ports remains intact and functioning.

In a preferred embodiment of the invention, the input and output ports of the original switching fabric are linked to the new switching fabric via electro/optic interfaces, which replace the standard input and output circuits of the original system.

DETAILED DESCRIPTION OF THE INVENTION

Figure 1:
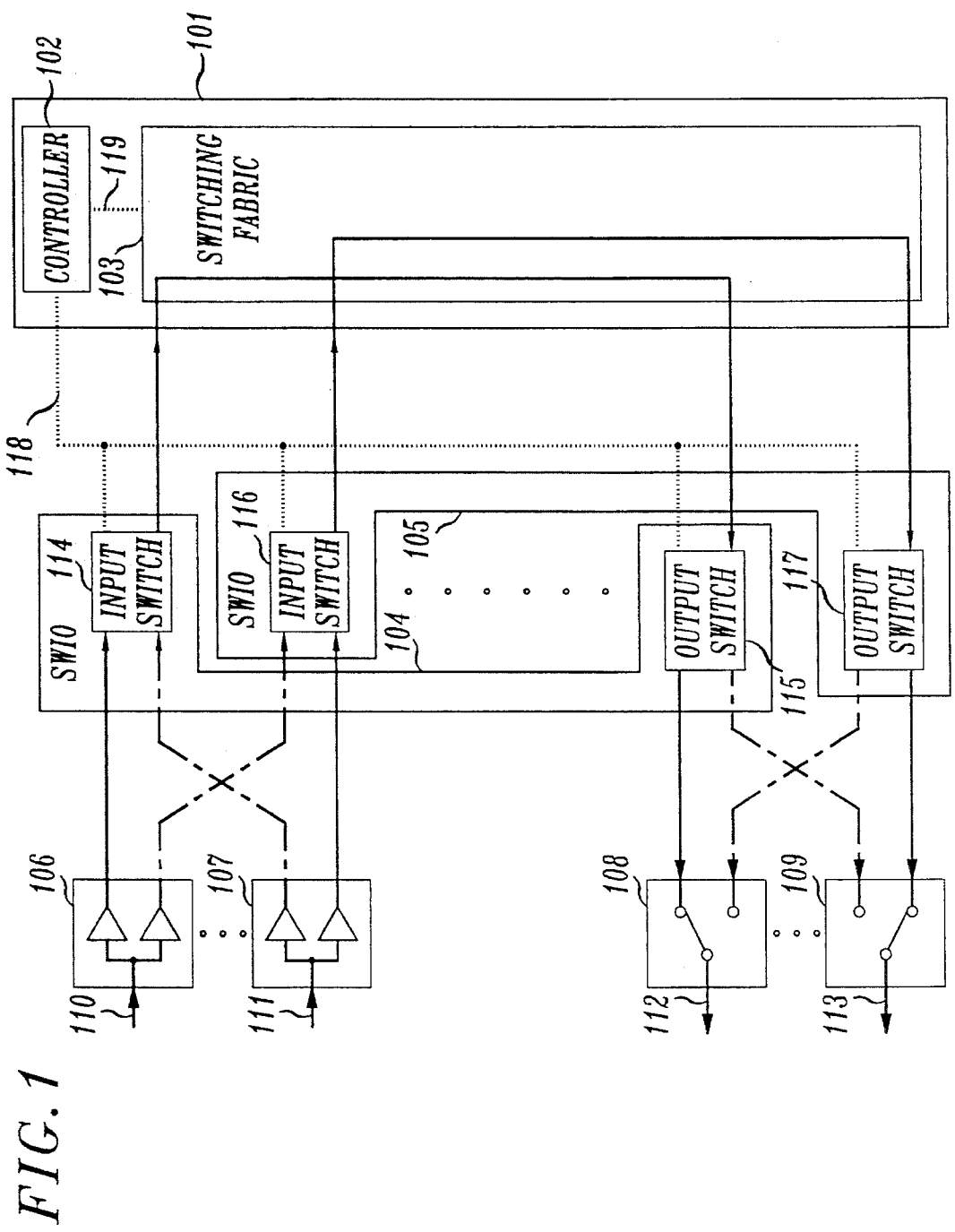
FIG. 1 is a simplified block diagram of a typical switching arrangement employed within a telecommunication network under normal operating conditions.

FIG. 1 is a simplified block diagram of a typical switching arrangement employed within a telecommunication network. As is shown, the switching arrangement includes fixed-capacity switch 101 (comprised of controller 102, switching fabric 103, and switch input/output circuits ("CSWIOs") 104 and 105), input buffers (106, 107), and output latches (108, 109). The SWIOs, latches, and buffers serve to link incoming (110, 111) and outgoing (112, 113) lines with switching fabric 103. Within each of the SWIOs, there is an input switch (labeled 114 within SWIO 104, and 115 within SWIO 105) and an output switch (labeled 116 within SWIO 104, and 117 within SWIO 105). Each input switch accepts telecommunication signals from buffers 106 and 107, and routes the signals to switching fabric 103. Correspondingly, each output switch receives telecommunication signals from switching fabric 103, and routes them to latches 108 and 109. Controller 102 is linked to the input and output switches by control bus 118 (shown as a dotted line), and to switching fabric 103 by control bus 119 (also shown as dotted line). Via these buses, controller 102 manages the routing of telecommunication signals through the SWIOs and switching fabric 103.

For purposes of protection, in the event of a transmission failure, each SWIO within a switching arrangement is paired with another SWIO. This pairing allows one SWIO to provide a connection through a protection path if the original service path provided by the other SWIO is disrupted. While only one SWIO pair is explicitly shown in FIG. 1, a typical telecommunications switching arrangement could consist of many more such SWIO pairs linked to a single switching fabric (as indicated by the dotted line separating SWIO 104 and SWIO 105). In addition, each of these SWIO pairs would typically accommodate up to 32 input and output lines (as indicated by the dotted lines between the illustrated buffers and latches).

As shown in FIG. 1, during normal operation of the switching arrangement, the signal from each incoming line is directed to two separate input switch ports—each within a different SWIO. One of these input switch ports provides a connection to a service path, and the other a connection to a protection path. SWIO 104 facilitates the service path connection between incoming line 110 and outgoing line 112, and the protection path connection between incoming line 111 and outgoing line 113. Similarly, SWIO 105 facilitates the service path connection between incoming line 111 and outgoing line 113, and the protection path connection between incoming line 110 and outgoing line 112. In FIG. 1 the service path connections between the SWIOs and the latches and buffers are depicted as solid lines, while the corresponding protection path connections are depicted as dashed lines. During normal operation, latch 108 is switched so that outgoing line 112 is connected by a service path to the output switch port of SWIO 104, and latch 109 is switched so that outgoing line 113 is connected by a service path to the output switch port of SWIO 105.

Figure 2:
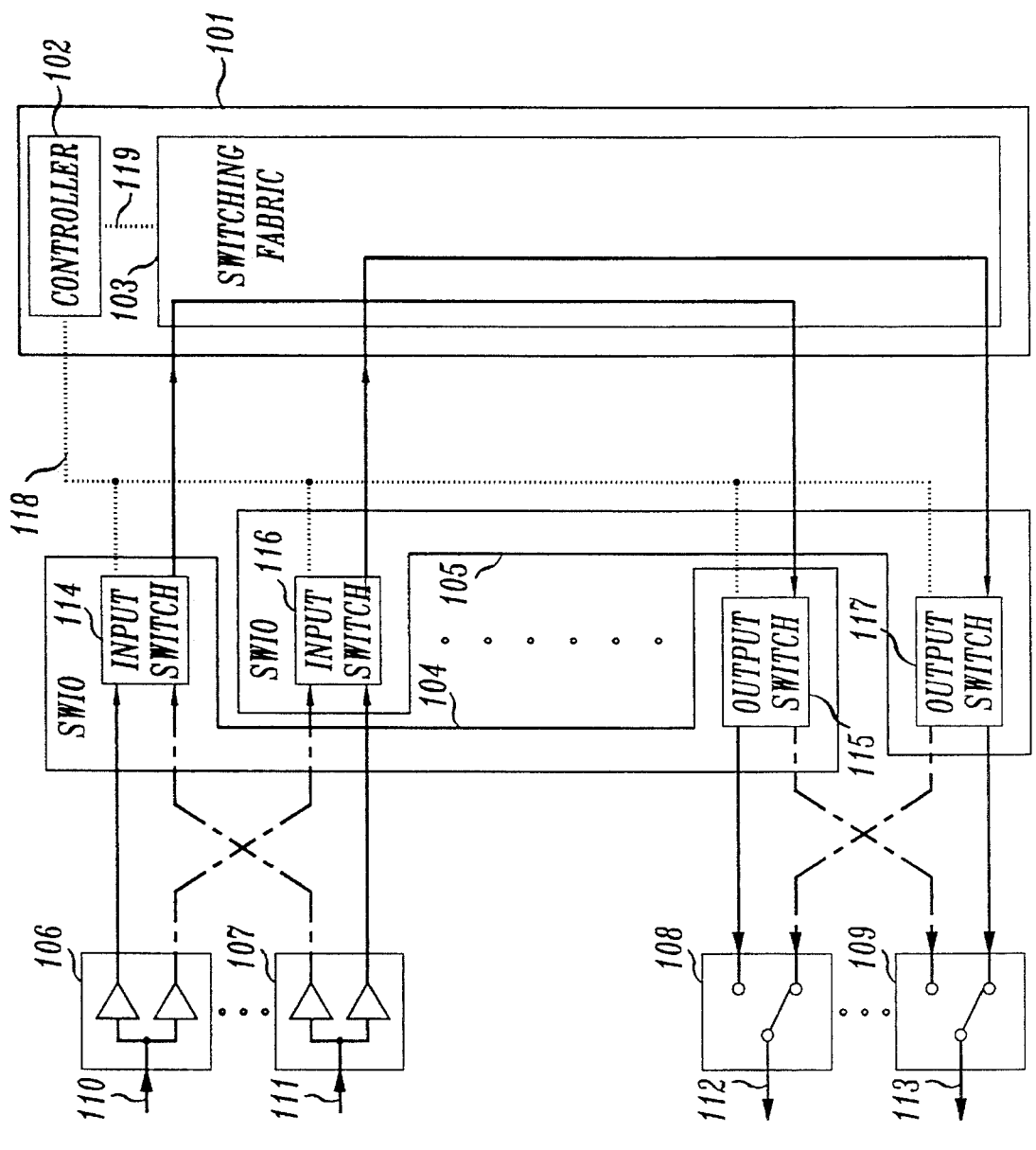
FIG. 2 is a simplified block diagram of the switching arrangement of FIG. 1 placed in a state where all telecommunications are routed through a single switch input/output circuit.

In effecting an in-service upgrade to a larger capacity switching arrangement, the invention employs a technique whereby all service is consolidated onto only one-half of the SWIOs normally employed to accommodate the standard level of connectivity provided by the switching arrangement. As shown in FIG. 2, latch 108 is set so that the signal from incoming line 110 (evident upon the protection path of output switch 117) is routed to outgoing line 112. The re-routing of the signal results in a brief interruption (approximately 50 ms in duration) of telecommunications between the incoming and outgoing lines. This interval of interruption is well within existing standards of operation for equipment in telecommunication applications, and will not interfere with normal communications. With latch 108 in this state, and latch 113 set in a normal operating state, all signals between incoming lines 110 and 111 and outgoing lines 112 and 113 are routed through SWIO 105. SWIO 104, which is paired with SWIO 105, is effectively taken out of service. With SWIO 104 out of service, and all available signal paths through SWIO 105 being utilized as a result of the signal consolidation, there exist no idle ports or paths to provide a protection channel if an existing connection between and incoming and outgoing line were to fail. Naturally, the system has an increased susceptibility to failure while in this consolidated state. This same signal consolidation technique could be applied to any number of SWIO pairs within a telecommunications switching arrangement. For example if sixteen SWIOs (eight SWIO pairs) were associated with a given switching fabric, service could be consolidated onto only eight SWIOs.

Figure 3:
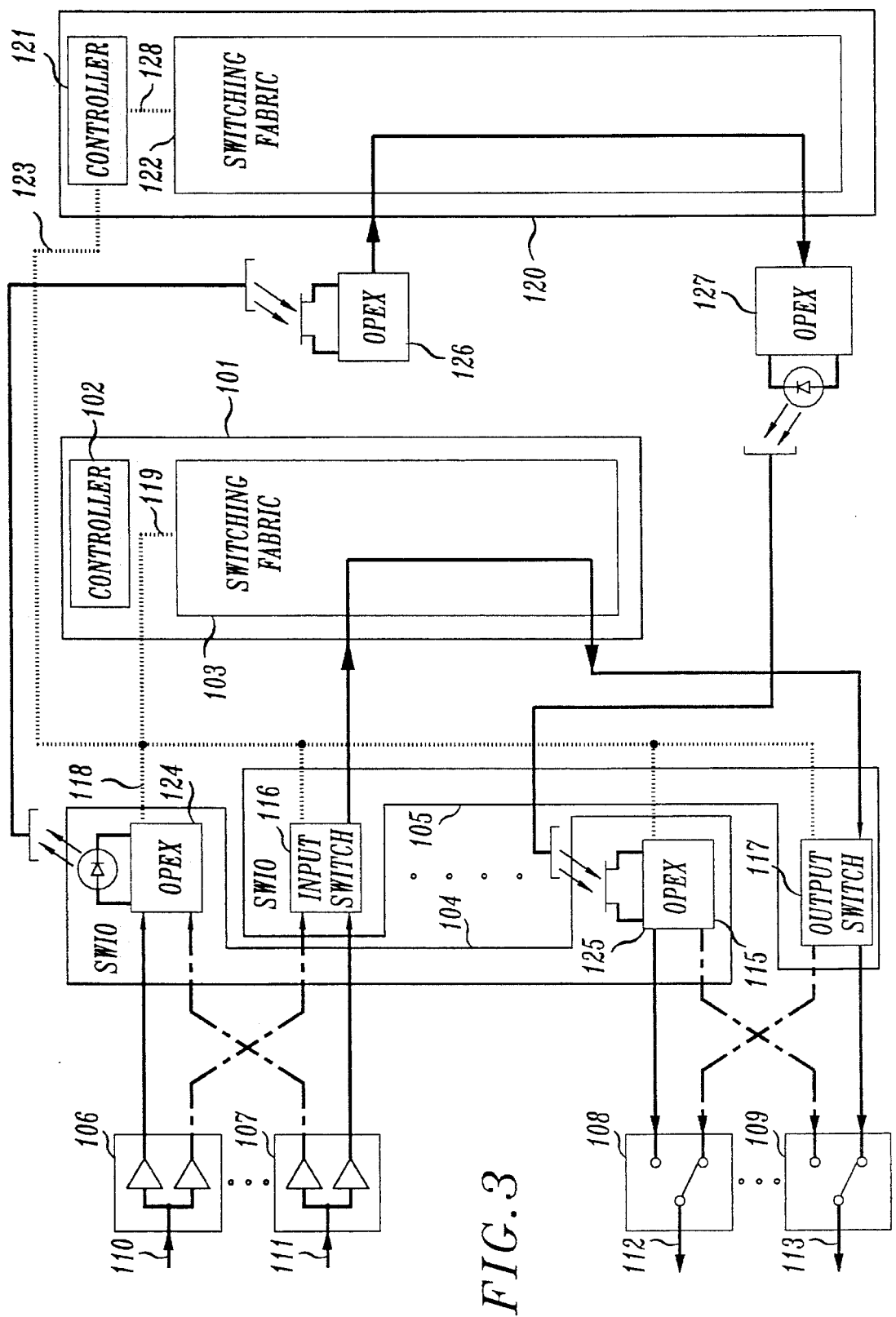
FIG. 3 is a simplified block diagram of the switching arrangement of FIG. 2 wherein one switch input/output circuit is optically linked to a high-capacity switching fabric.

The next phase of the service upgrade technique is illustrated in FIG. 3. Telecommunication switch 120, comprised of controller 121 and high-capacity switching fabric 122, is positioned at a location in the vicinity of switch 101. While the switches need not be collocated, switch 120 should be situated within such a distance of switch 101 to avoid causing either an excessive transit delay in the signal paths between the existing SWIOs and high-capacity switching fabric 122, or a degradation in the transmission of control signals between the SWIOs, switch 101, and controller 121. A mapping of the present configuration of SWIO 105 and switching fabric 103 is then loaded into controller 121. This may be accomplished by up-loading the mapping from controller 102 to a personal computer, and then downloading the map from the personal computer to controller 121. Control of SWIOs 104 and 105, as well as switching fabric 103, is then assumed by controller 121 via control bus 123 (shown as a dotted line). Controller 102 is then taken off-line.

Input switch 114 and output switch 115 within SWIO 104 are then replaced with optical extension circuit packs ("COPEXs") 124 and 125, respectively. Each OPEX provides either an electrical to optical interface, or an optical to electrical interface. Devices adapted for performing such electro/optical signal conversions within telecommunication systems are well known in the art. Ideally, to maximize ease of installation, each OPEX utilized can be adapted to be held in the same equipment bay which originally housed the input and output switches. OPEX 124 is an electrical/optical interface adapted to receive electrical signals from buffers 106 and 107, and convert the received signals into optical signals suitable for transmission via an optical fiber. The optical output of OPEX 124 is then linked by optical fiber to OPEX 126 (collocated with switch 120). OPEX 126 converts the received optical signal to an electrical signal which is input to high-capacity switching fabric 122. High-capacity switching fabric 122 is also linked to collocated OPEX 127. OPEX 127 accepts electrical signals from high-capacity switching fabric 122, converts those signals into optical signals, and transmits the optical signals to OPEX 125. OPEX 125 is adapted to receive the optical signals, and covert those signals into electrical signals for output to latches 108 and 109. Controller 121 is linked to high-capacity switching fabric 122 by control bus 128 (shown as a dotted line). Controller 121 then establishes a telecommunications path between OPEX 124 and OPEX 125 (by way of OPEX 126, high-capacity switching fabric 122, and OPEX 127).

Figure 4:
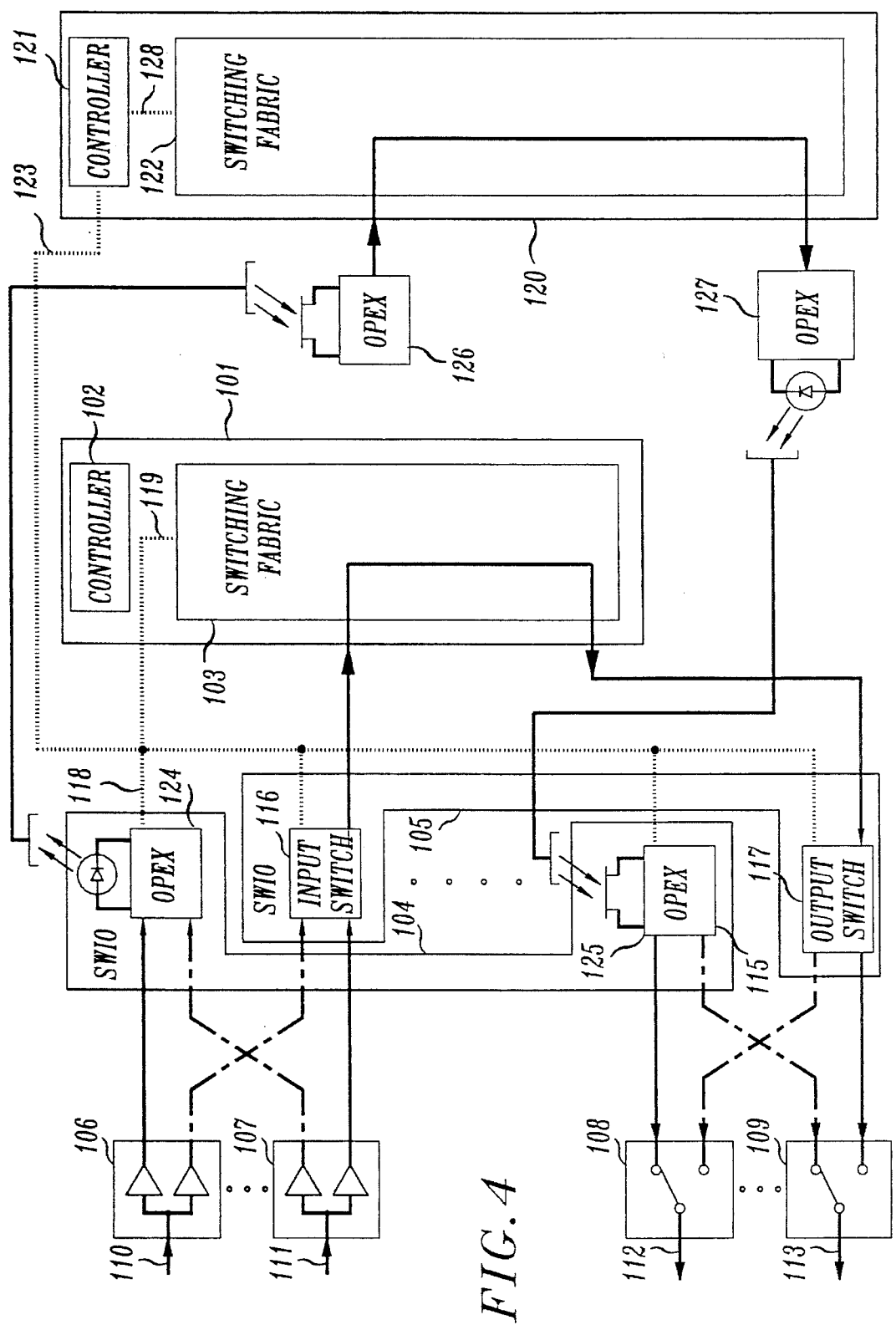
FIG. 4 is a simplified block diagram of the switching arrangement of FIG. 3 placed in a state where all telecommunications are routed through the high capacity switching fabric.

After the telecommunication path is established between OPEX 124 and OPEX 125, latches 108 and 109 are switched so that outgoing lines 112 and 113 are connected to OPEX 125 (as illustrated in FIG. 4). This results in all signals between incoming lines 110 and 111 and outgoing lines 112 and 113 being routed through SWIO 104. The switching of latches 108 and 109 to receive input from SWIO 104 causes a second brief interruption (approximately 50 ms in duration) of telecommunications between the incoming and outgoing lines.

Figure 5:
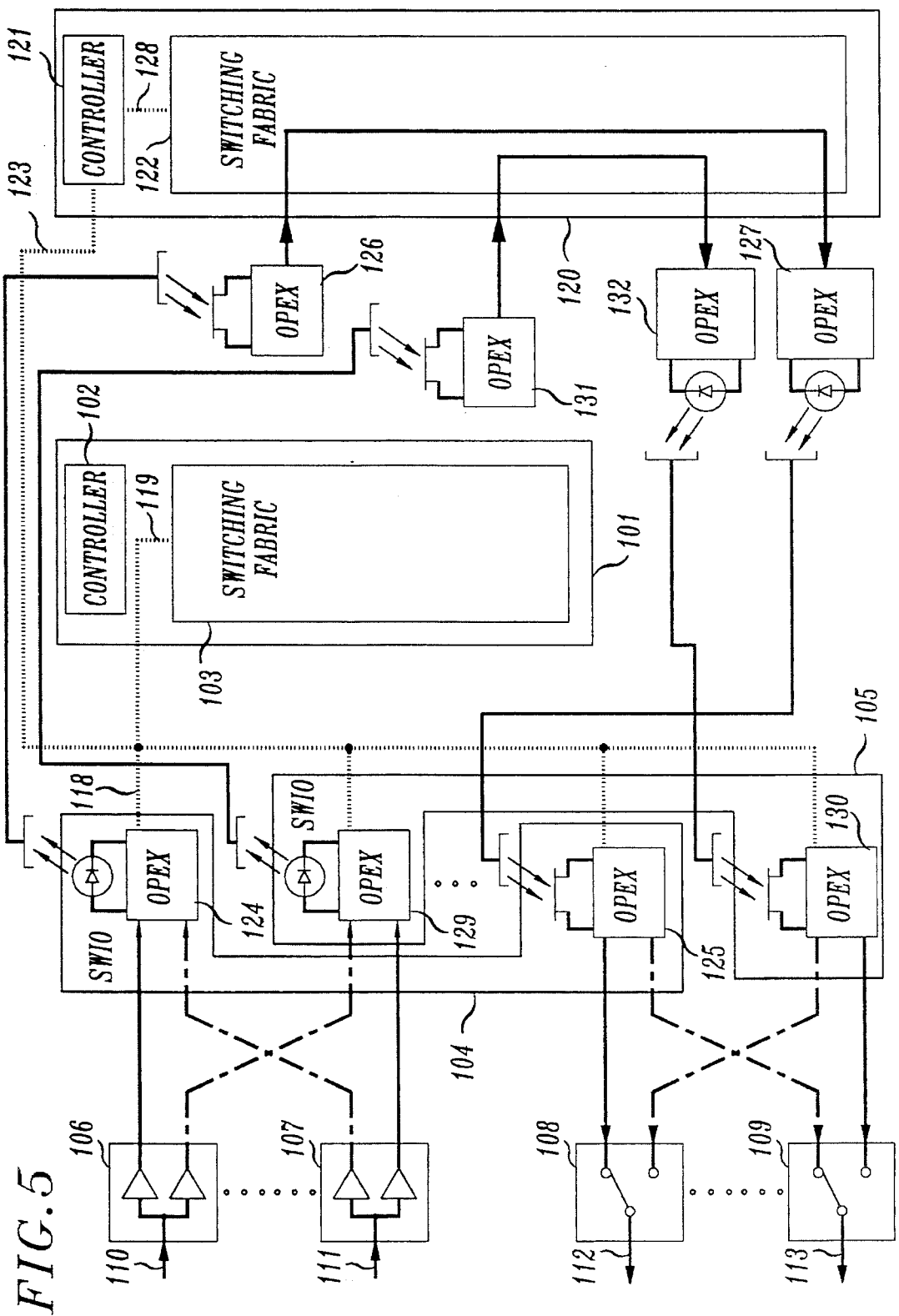
FIG. 5 is a simplified block diagram of the switching arrangement of FIG. 4 wherein both switch input/output circuits are optically linked to the high-capacity switching fabric.

With SWIO 105 out of circuit, input switch 116 and output switch 117 are then replaced with OPEXs 129 and 130, respectively (see FIG. 5). OPEX 129 converts the electrical signals from buffers 106 and 107 into optical signals, and transmits those optical signals via an optical fiber to OPEX 131 (collocated with switch 120). OPEX 131 converts the received optical signal to an electrical signal which is input to high-capacity switching fabric 122. High-capacity switching fabric 122 is also linked to collocated OPEX 132, which accepts electrical signals from high-capacity switching fabric 122, converts those signals into optical signals, and transmits the optical signals to OPEX 130. OPEX 130 converts the received optical signals into electrical signals for output to latches 108 and 109. Controller 121 then establishes a telecommunications path between OPEX 129 and OPEX 130 (via OPEX 131, high-capacity switching fabric 122, and OPEX 132).

Figure 6:
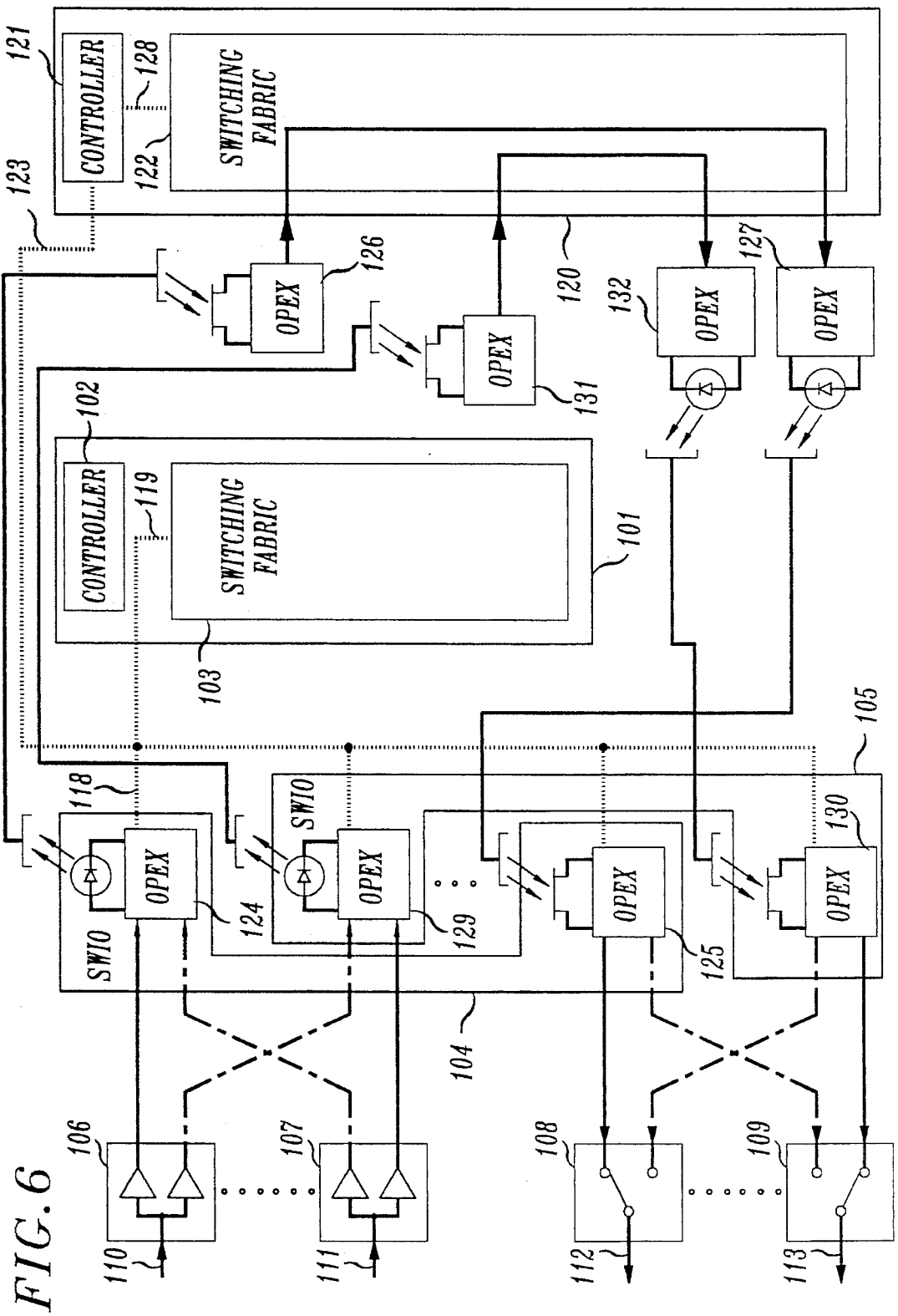
FIG. 6 is a simplified block diagram of the switching arrangement of FIG. 5 placed in a state where telecommunications are distributed evenly between the two switch input/output circuits.

As shown in FIG. 6, latch 109 is then switched so that outgoing line 113 is connected by a service path to the output switch port of SWIO 105. Latch 108 is already in a state which connected outgoing line 113 to the output switch port of SWIO 104 by a service path. The switching of latch 109 causes a third 50 ms interruption of telecommunications between the incoming line 110 and outgoing line 113. This finally returns the telecommunication switching arrangement to an un-consolidated state. Service is distributed evenly between SWIO 104 and SWIO 105, and each service path has a corresponding protection path which may be utilized in the event of a service path failure.

The technique allows the original cabling to and from the input and output switch ports, as well as the original bays used to house the input and output switches, to remain intact since the OPEXs are placed in the same physical slots occupied by the input and output switches which they replace. Furthermore, as a single controller (121) manages the routing of signals through the upgraded switching arrangement, problems associated with multiple network operation control points are avoided. In addition, as a result of the technique, the original switch (101) is completely disconnected from the SWIOs and switch 120. Consequently, the original switch may be mated with new SWIOs, and re-utilized to provide additional switching capacity within the telecommunication network.

The above-described invention provides a reliable, operationally transparent, and economically attractive technique for performing an in-service upgrade upon an existing telecommunication switching arrangement. It will be understood that the particular embodiment described is only illustrative of the principles of the present invention, and that various modifications could be made by those skilled in the art without departing from the scope and spirit of the present invention, which is limited only by the claims that follow.

One such modification would include employing bi-directional OPEXs, and bi-directional optical links interconnecting those OPEXs. This would facilitate the transmission of both incoming and outgoing telecommunication signals along the same path between the SWIOs and the high-capacity switching fabric. Another modification would employ non-optical optical extension circuit packs instead of OPEXs for linking the SWIOs and the high-capacity switching fabric. Naturally these non-optical extension circuit packs would require that electrical, not optical, connections be effected between the SWIOs and the high-capacity switch. As a result the high-capacity switch would have to be located closer to the original switch than would be required if optical interconnections were employed. This reduction in the maximum allowable distance between the switches is due to the decreased transmission rates, and increased timing differences and signal losses resulting from the use of electrical interconnections.

It should also be understood that although in the above described embodiment the invention was applied to a "three stage" telecommunication system (input SWIO, switching fabric, and output SWIO), it may be practiced upon switching systems having any number of stages. Similarly, although the above detailed description focused upon a telecommunication system employing a 1-to-1 protection scheme (wherein a protection channel is provided for each service channel), the invention may also be applied to telecommunication systems which employ full duplex protection schemes, or 1-to-N protection schemes. The primary requirement for employing the invention being the existence of a sufficient number of redundant paths within a given telecommunication system to facilitate the signal consolidation technique. The invention can also be readily applied to telecommunication systems regardless of the particular switching fabric implementation (i.e., the input and output stages can be collocated within a single circuit pack, or each may located in a separate circuit pack).

We claim:

1. A method for replacing a first fixed-capacity switching fabric with a second fixed-capacity switching fabric, comprising the step of:

consolidating a first set of switchable paths between a first group of N telecommunication lines and a second group of N telecommunication lines so that all of said switchable paths that had been routed through a first, second, third, and fourth telecommunication channels and an associated first, second, third, and fourth interfaces are routed exclusively through said first and said third interfaces, said first and said third telecommunication channels, and said first fixed-capacity switching fabric;

linking said second interface and said second fixed-capacity switching fabric, via a fifth telecommunication channel adapted to transmit at least N telecommunication signals;

linking said fourth interface and said second fixed-capacity switching fabric, via a sixth telecommunication channel adapted to transmit at least N telecommunication signals; establishing a second set of switchable paths through said second interface, said fifth telecommunication channel, said second fixed-capacity switching fabric, said sixth telecommunication channel, and said fourth interface, wherein said second set of switchable paths provides the same connectivity between said first group of N telecommunication lines and said second group of N telecommunication lines as is provided by said first set of switchable paths;

linking said first interface and said second fixed-capacity switching fabric, via a seventh telecommunication channel adapted to transmit at least N telecommunication signals;

linking said third interface and said second fixed-capacity switching fabric, via an eighth telecommunication channel adapted to transmit at least N telecommunication signals; and redistributing said second set of switchable paths between said first group of N telecommunication lines and said second group of N telecommunication lines so that they are routed through said second fixed-capacity switching fabric, said first, second, third, and fourth interfaces, and said fifth, sixth, seventh, and eighth telecommunication channels.

2. The method of claim 1 wherein said fifth, sixth, seventh, and eighth telecommunication channels are optical channels.

3. A method for replacing a first fixed-capacity switching fabric with a second fixed-capacity switching fabric, comprising the steps of:

consolidating a first set of switchable paths between a first group of N telecommunication lines and said second group of N telecommunication lines so that all of said switchable paths that had been routed through a first, second, third, and fourth telecommunication channels and an associated first, second, third, and fourth interfaces are routed exclusively through said first and said third interfaces, said first and said third telecommunication channels, and said first fixed-capacity switching fabric;

replacing said second interface with a fifth interface and providing a fifth telecommunication channel adapted to transmit at least N telecommunication signals between said first group of N telecommunication lines and said second fixed-capacity switching fabric;

replacing said fourth interface with a sixth interface and providing a sixth telecommunication channel adapted to transmit at least N telecommunication signals between said second group of N telecommunication lines and said second fixed-capacity switching fabric;

establishing a second set of switchable paths through said fifth interface, said fifth telecommunication channel, said second fixed-capacity switching fabric, said sixth telecommunication channel, and said sixth interface, wherein said second set of switchable paths provides the same connectivity between said first group of N telecommunication lines and said second group of N telecommunication lines as is provided by said first set of switchable paths;

replacing said first interface with a seventh interface providing a seventh telecommunication channel adapted to transmit at least N telecommunication signals between said first group of N telecommunication lines and said second fixed-capacity switching fabric;

replacing said third interface with an eighth interface providing an eighth telecommunication channel adapted to transmit at least N telecommunication signals between said second group of N telecommunication lines and said second fixed-capacity switching fabric; and redistributing said second set of switchable paths between said first group of N telecommunication lines and said second group of N telecommunication lines so that they are routed through said second fixed-capacity switching fabric, said fifth, sixth, seventh, and eighth interfaces, and said fifth, sixth, seventh, and eighth telecommunication channels.

4. The method of claim 3 wherein said fifth, sixth, seventh, and eighth telecommunication channels are optical channels.

5. A method for replacing a first fixed-capacity switching fabric with a second fixed-capacity switching fabric, comprising the steps of:

consolidating a first set of switchable paths between a first group of N telecommunication lines and a second group of N telecommunication lines so that all of said switchable paths that had been routed through a first, second, third, and fourth telecommunication channels and an associated first, second, third, and fourth interfaces are routed exclusively through said first and said third interfaces, said first and said third telecommunication channels, and said first fixed-capacity switching fabric;

linking said second interface and said second fixed-capacity switching fabric, via a fifth telecommunication channel adapted to transmit at least N telecommunication signals;

linking said fourth interface and said second fixed-capacity switching fabric, via a sixth telecommunication channel adapted to transmit at least N telecommunication signals;

establishing a second set of switchable paths through said second interface, said fifth telecommunication channel, said second fixed-capacity switching fabric, said sixth telecommunication channel, and said fourth interface, wherein said second set of switchable paths provides the same connectivity between said first group of N telecommunication lines and said second group of N telecommunication lines as is provided by said first set of switchable paths;

linking said first interface and said second fixed-capacity switching fabric, via a seventh telecommunication channel adapted to transmit at least N telecommunication signals;

linking said third interface and said second fixed-capacity switching fabric, via an eighth telecommunication channel adapted to transmit at least N telecommunication signals; and redistributing said second set of switchable paths between said first group of N telecommunication lines and said second group of N telecommunication lines so that they are routed through said second fixed-capacity switching fabric, said first, second, third, and fourth interfaces, and said fifth, sixth, seventh, and eighth telecommunication channels.

6. The method of claim 5 wherein said fifth, sixth, seventh, and eighth telecommunication channels are optical channels.

7. A method for replacing a first fixed-capacity switching fabric with a second fixed-capacity switching fabric, comprising the steps of:

consolidating said first set of switchable paths between a first group of N telecommunication lines and a second group of N telecommunication lines so that all of said switchable paths that had been routed through a first, second, third, and fourth telecommunication channels and an associated first, second, third, and fourth interfaces are routed exclusively through said first and said third interfaces, said first and said third telecommunication channels, and said first fixed capacity switching fabric;

replacing said second interface with a fifth interface providing a fifth telecommunication channel adapted to transmit at least N telecommunication signals between said first group of N telecommunication lines and said second fixed-capacity switching fabric in response to a control signal;

replacing said fourth interface with a sixth interface providing a sixth telecommunication channel adapted to transmit at least N telecommunication signals between said second group of N telecommunication lines and said second fixed-capacity switching fabric in response to a control signal;

establishing a second set of switchable paths through said fifth interface, said fifth telecommunication channel, said second fixed-capacity switching fabric, said sixth telecommunication channel, and said sixth interface, wherein said second set of switchable paths provides the same connectivity between said first group of N telecommunication lines and said second group of N telecommunication lines as is provided by said first set of switchable paths;

replacing said first interface with a seventh interface providing a seventh telecommunication channel adapted to transmit at least N telecommunication signals between said first group of N telecommunication lines and said second fixed-capacity switching fabric in response to a control signal;

replacing said third interface with an eighth interface providing an eighth telecommunication channel adapted to transmit at least N telecommunication signals between said second group of N telecommunication lines and said second fixed-capacity switching fabric in response to a control signal; and redistributing said second set of switchable paths between said first group of N telecommunication lines and said second group of N telecommunication lines so that they are routed through said second fixed-capacity switching fabric, said fifth, sixth, seventh, and eighth interfaces, and said fifth, sixth, seventh, and eighth telecommunication channels.

8. The method of claim 7 wherein said fifth, sixth, seventh, and eighth telecommunication channels are optical channels.

* * * * *